United States Patent [19]

Mercer et al.

[11] Patent Number: 4,879,338

[45] Date of Patent: Nov. 7, 1989

[54] POLY(ARYL ETHER KETONE) COMPOSITIONS

[75] Inventors: Frank W. Mercer, Belmont; Michael F. Froix, Los Altos; Tai C. Cheng, Mountain View, all of Calif.

[73] Assignee: Raychem Corporation, Menlo Park, Calif.

[21] Appl. No.: 701,279

[22] Filed: Feb. 13, 1985

[51] Int. Cl.$^4$ .............................................. C08L 71/04
[52] U.S. Cl. .................................... 524/508; 428/704; 522/134; 524/495; 525/390; 525/397
[58] Field of Search ................ 525/397, 390; 524/598, 524/508

[56] References Cited

U.S. PATENT DOCUMENTS

| | | |
|---|---|---|
| 3,257,357 | 6/1966 | Stamatoff ............................... 260/47 |
| 3,257,358 | 6/1966 | Stamatoff ............................... 260/47 |
| 3,306,874 | 2/1967 | Hay ....................................... 528/215 |
| 3,306,875 | 2/1967 | Hay ....................................... 260/47 |
| 3,355,272 | 11/1967 | D'Alessandro . |
| 3,370,107 | 2/1968 | Barth . |
| 3,536,657 | 10/1970 | Nochay et al. . |
| 4,108,837 | 8/1978 | Johnson et al. . |
| 4,250,279 | 2/1981 | Robeson et al. . |
| 4,293,670 | 10/1981 | Robeson et al. . |
| 4,369,136 | 1/1983 | Robeson et al. . |
| 4,388,444 | 6/1983 | Irvin ........................................ 525/92 |
| 4,440,890 | 4/1984 | Robeson . |
| 4,503,121 | 3/1985 | Robeson et al. . |
| 4,532,305 | 7/1985 | Dickinson . |
| 4,536,543 | 8/1985 | Matzner et al. ...................... 525/390 |
| 4,536,544 | 8/1985 | Matzner et al. ...................... 525/390 |
| 4,540,630 | 9/1985 | Wegner et al. . |

FOREIGN PATENT DOCUMENTS 38952 11/1974 Japan ................................... 525/397

OTHER PUBLICATIONS

Poly(Aryl Ethers) by Nucleophilic Aromatic Substitution, Journal of Polymer Science, Part A-1, vol. 5, 2375-2398 (1967).

*Primary Examiner*—Jacob Ziegler
*Attorney, Agent, or Firm*—Yuan Chao; Edith A. Rice; Herbert G. Burkard

[57] ABSTRACT

This invention discloses novel composition comprising a blend of a poly(aryl ether ketone) and from about 1% to about 50% of poly(phenylene oxide). The blends have high use temperatures, abraision resistance and solvent resistance, and are extrudable. Further, the blends can be crosslinked.

6 Claims, No Drawings

POLY(ARYL ETHER KETONE) COMPOSITIONS

BACKGROUND OF THE INVENTION (a) Field of the Invention

This invention relates to novel polymeric compositions. In particular, this invention relates to novel polymeric compositions comprising a poly(aryl ether ketone) and poly(phenylene oxide) which posses high use temperatures with high abrasion resistance.

(b) Background Information

Poly(aryl ether ketones) are tough rigid high strength thermoplastics which maintain their properties over a wide temperature range of from about −150° F. to about 300° F. They have a high continuous use temperature of about 300° F. They are hydrolytically stable, highly resistant to mineral acids, and salt solutions and are extrudable. It is known that polymers which can be crosslinked, for example by radation or peroxides, will have increased high use temperatures, and be made heat recoverable. Poly(aryl ether ketones) alone, however, cannot be crosslinked by either radiation or peroxides, even with the use of crosslink promotors. See eg U.S. Pat. No. 4,108,837, 4,300,224, 3,953,400, and 3,956,240.

Poly(phenylene oxide) (PPO) is a high temperature resin which is crosslinkable, but difficult to extrude. See, for example, British Patent No. 990,993 (1958). PPO has an optimum processing temperature of from about 230° C. to about 300° C. which is at least particularly responsible for the difficulties in melt processing of PPO. PPO also exhibits poor heat aging above 200° C. and poor solvent resistance.

SUMMARY OF THE INVENTION

It has been discovered that novel blends comprising a poly(aryl ether ketone) and from about 1% to about 50% of poly(phenylene oxide) have high use temperatures, exhibit improved solvent resistance, and are extrudable and crosslinkable. The blends are useful for high temperature uses, such as wire and cable insulation; high recovery force heat shrinkable articles; fibers; composites; friction and wear applications; and electrically conductive polymers or membranes.

Poly(aryl ether ketones) suitable for use in this invention have the repeat unit of the formula:

—CO—Ar—CO—Ar′— wherein Ar and Ar′ are aromatic moieties at least one of which contains a diaryl ether linkage forming part of the polymer backbone and wherein both Ar and Ar′ are covalently linked to the carbonyl groups through aromatic carbon atoms.

Preferably, Ar and Ar′ are independently selected from substituted and unsubstituted phenylene and substituted and unsubstituted polynuclear aromatic moieties. The term polynuclear aromatic moieites is used to mean aromatic moieties containing at least two aromatic rings. The rings can be fused, joined by a direct bond or by a linking group. Such linking groups include for example, carbonyl, ether sulfone, sulfide, amide, imide, azo, alkylene, perfluoroalkylene and the like. As mentioned above, at least one of Ar and Ar′ contains a diaryl ether linkage.

The phenylene and polynuclear aromatic moieties can contain substituents on the aromatic rings. These substituents should not inhibit or otherwise interfere with the polymerization reaction to any significant extent. Such substituents include, for example, phenyl, halogen, nitro, cyano, alkyl, 2-alkynyl and the like.

Poly(aryl ether ketones) having the following repeat units (the simplest repeat unit being designated for a given polymer) are preferred:

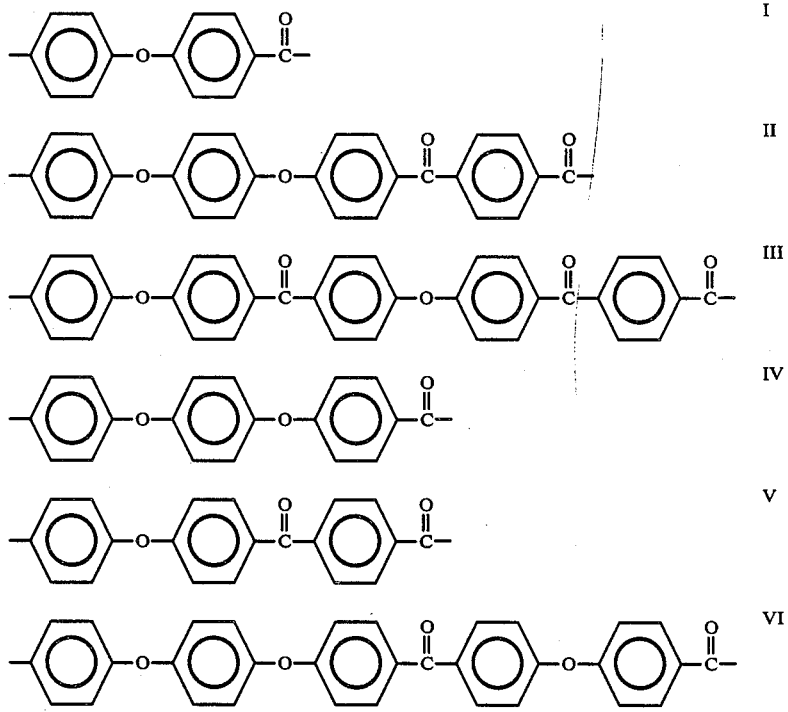

Poly(aryl ether ketones) can be prepared by known methods of synthesis. Preferred poly(aryl ether ketones)

can be prepared by Friedel-Crafts polymerization of a monomer system comprising:

(I)
  (i) phosgene or an aromatic diacid dihalide together with
  (ii) a polynuclear aromatic comonomer comprising:
    (a) H—Ar—O—Ar—H
    (b) H—(Ar—O)$_n$—Ar—H wherein n is 2 or 3
    (c) H—Ar—O—Ar—(CO—Ar—O—Ar)$_m$—H wherein m is 1, 2 or 3 or (II) an acid halide of the formula: H—Ar″—O—[-(Ar″—CO)$_p$—(Ar″—O)$_q$(AR″—CO)$_r$]$_k$—Ar′-′—CO—Z wherein Z is halogen, k is 0, 1 or 2, p is 1 or 2, q is 0, 1 or 2 and r is 0, 1 or 2; or (III) an acid halide of the formula: H—(Ar″—O)$_n$—Ar″—Y wherein n is 2 or 3 and Y is CO—Z or CO—Ar″—CO—Z where Z is halogen; wherein each Ar″ is independently selected from substituted or unsubstituted phenylene, and substituted and unsubstituted polynuclear aromatic moieties free of ketone carbonyl or ether oxygen groups, in the presence of a reaction medium comprising:

(A) A Lewis acid in an amount of one equivalent per equivalent of carbonyl groups present, plus one equivalent per equivalent of Lewis base, plus an amount effective to act as a catalyst for the polymerization;

(B) a Lewis base in an amount from 0 to about 4 equivalents per equivalent of acid halide groups present in the monomer system;

(C) a non-protic diluent in an amount from 0 to about 93% by weight, based on the weight of the total reaction mixture.

The aromatic diacid dihalide employed is preferably a dichloride or dibromide. Illustrative diacid dihalides which can be used include, for example

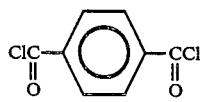

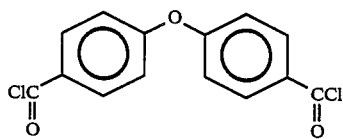

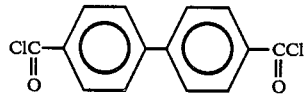

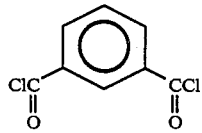

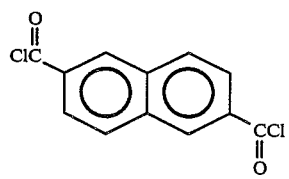

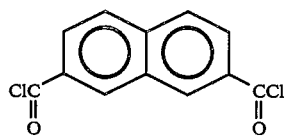

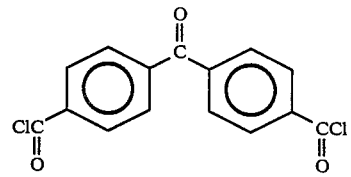

wherein a is 0–4.

Illustrated polynuclear aromatic comonomers which can be used with such diacid halides are:
(a) H—Ar″—O—Ar″—H, which includes, for example:

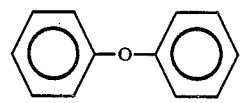

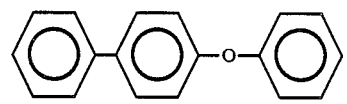

(b) H—(Ar″—O)$_n$—Ar″—H, which include, for example:

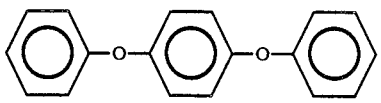

and

(c)    H—Ar″—O—Ar″—(CO—Ar″—O—Ar™-)$_m$—H, which includes, for example:

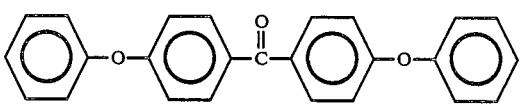

(d)    H—(Ar″—O)$_n$—Ar″—CO—Ar″—(O—Ar″-)$_m$—H which includes, for example:

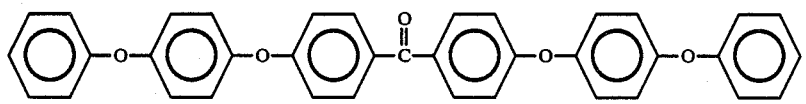

Monomer systems II and III comprise an acid halide. (The term acid halide is used herein to refer to a monoacid monohalide.) In monomer system II, the acid halide is of the formula:

H—Ar''—O—[(Ar''—CO)$_p$—(Ar''—O)$_q$—(Ar''—CO)$_r$]$_k$—Ar''—CO—Z

Such monomers include for example, where k=0

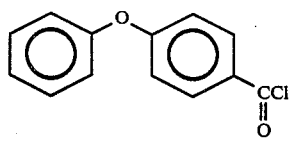

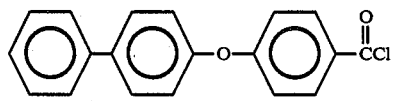

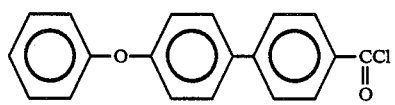

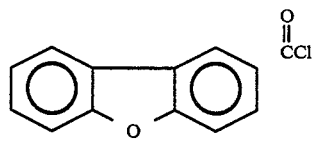

and where k—1

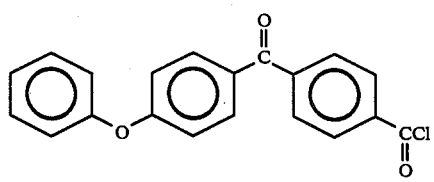

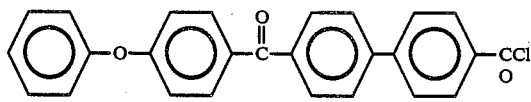

In monomer system III, the acid halide is of the formula

H—(Ar''—O)$_n$—Ar''—Y

Examples of such acid halides include

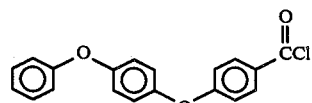

and

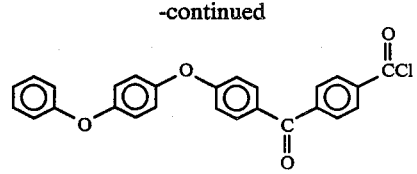

It is to be understood that combinations of monomers can be employed. For example, one or more diacid dihalides can be used with one or more polynuclear aromatic comonomers as long as the correct stoichiometry is maintained. Further, one or more acid halides can be included. In addition monomers which contain other linkages such as those specified above, can be employed as long a one or more of the comonomers used contains at least one ether oxygen linkage. Such comonomers include for example:

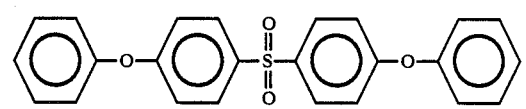

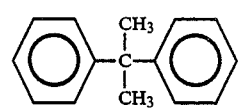

which can be used as the sole comonomer with an ether containing diacid dihalide or with phosgene or any diacid dihalide when used in addition to a polynuclear aromatic comonomer as defined in I(ii)(a), I(ii)(b), I(ii)(c) or I(ii)(d). Similarly

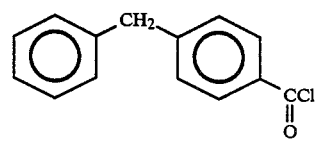

can be used as a comonomer together with an ether-containing polynuclear aromatic acid halide or as an additional comonomer together with a monomer system as defined in I.

The monomer system can also contain up to about 30 mole % of a comonomer such as a sulfonyl chloride which polymerizes under Friedel-Crafts conditions to provide ketone/sulfone copolymers.

Further details of this process for producing poly(aryl ether ketones) can be found in commonly assigned co-pending U.S. application Ser. No. 594,503, filed Mar. 31, 1984, the disclosure of which is incorporated herein by reference.

Other processes for preparing these polymers can be found in U.S. Pat. Nos. 3,953,400, 3,956,240, 3,928,295, 4,108,837, 4,176,222 and 4,320,224.

Poly(phenylene oxide) (PPO) is a high temperature resin. A preferred PPO is poly(2,6-dimethy-p-phenylene oxide) which has the formula:

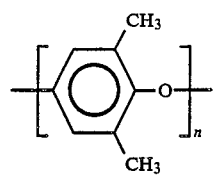

wherein n>1 the blends of the invention contain from about 1% to about 50% PPO. More preferrably the blends contain from about 1% to about 30% PPO. At greater than about 50% PPO the properties of the blend become substantially that of the PPO alone. Solvent resistance is therefore reduced and the blends do not perform as well as the blends within the limits of the invention.

The composition of the invention can be made by any convenient method, such as by using mills, mixers, extruders and the like techniques known in the art for blending. A shaped article of the blend can be formed by known techniques depending on the desired shape. In a preferred embodiment articles of the invention contain from about 1% to about 30% graphite. Films or coatings of the blend can be formed by extrusion, lamination. Fibers could be made, for example, by extrusion or melt spining. Other articles may be injection molded, pour molded, blow molded or the like with or without additives. Preferred articles can be used where their surfaces are subjected a high degree of friction and wear such as valve seats, typewritten and printer plattens, bearing surfaces and the like.

The composition of the invention may be subjected to crosslinking. Crosslinking may be accomplished either by ionizing radiation, such as electron beam (Beta radiation) or cobalt 60 (Gamma radiation) or by chemically crosslinking such as by a peroxide. The composition may further contain crosslink promotors or cure site monomers which will enhance the crosslinking effect. Examples of suitable crosslink promotors and cure site monomers are well-known in the art. Said crosslinked compositions will show improved solvent and temperature resistance and abrasion resistance when compared with the uncrosslinked composition. Further, the crosslinked composition may be made into a heat recoverable form by known methods.

The compositions of the invention can contain various additives in addition, in order to give a desired property to the composition. For example, stabilizers, pigments, non-reinforcing fillers, thermat stabilizers, U.V. light stabilizer processing aids, impact modifiers, flame retardants, pigments, plasticizers, carbon black, graphite, surfactants, antioxidants and the like may also be present. Polymers which are compatible or non-compatible with the poly(aryl ether ketone) may also be added to give a desired property. It is further understood that more than one poly(aryl ether ketone) may be used in the composition.

The invention also relates to a reinforced composition comprising the blend and a reinforcing component e.g. carbon, or glass fibers or other polymeric fibers or the like forming a high strength composite.

The following examples are representative of the invention but are not intended to be limiting. Substitution of additives, materials, polymers, methods and conditions which are obvious from this disclosure are within the contemplation of the invention.

DESCRIPTION OF THE PREFERRED EMBODIMENTS

The following examples were made using the commercial poly(aryl ether ketone) Victrex PEEK from ICI. Both 100% PPO Poly Sciences and Noryl N300 (General Electric) a blend of PPO and polystyrene are used.

The following examples list the various mechanical properties of various Victrex PEEK/PPO and Victrex PEEK/Noryl blends. The examples were tested at room temperature and at 175° C. Samples were also crosslinked by an electron beam using 100 Mrads per side (200 Mrad total). The blends were made using a ZSE twin screw extruder at temperatures from 300° to 385° C. Tensile elongation and stress were tested by ASTM D-638. Below Table I lists the mechanical properties of various PEEK/PPO and PEEK/Noryl blends. Samples were tested at room temperature and at 175° C. Samples were also tested after exposure to 200 Mrads (100 Mrads per side).

TABLE I

| Example | | Test Temp. | Electron Beam Dose (Mrads) | % Elongation | Stress (psi) | Percent Gel |
|---|---|---|---|---|---|---|
| 1. | Victrex PEEK | RT* | 0 | 86 | 11,739 | — |
|    |        | 175° C. | 0 | 210 | 6,008 | — |
| 2. | V PEEK/ PPO 90/10 | RT | 0 | 39 | 11,846 | — |
|    |        | RT | 200 | 97.5 | 11,046 | — |
|    |        | 175° C. | 0 | >293 | >6,615 | — |
|    |        | 175° C. | 200 | >297 | >6,654 | — |
| 3. | V PEEK/ PPO 70/30 | RT | 0 | 5 | 11,308 | — |
|    |        | RT | 200 | 5 | 11,477 | — |
|    |        | 175° C. | 0 | >297 | >5,323 | — |
|    |        | 175° C. | 200 | >299 | >4,800 | — |
| 4. | V PEEK/ PPO 50/50 | RT | 0 | 5 | 8,615 | 57 |
|    |        | RT | 200 | 5 | 8,015 | 66 |
|    |        | 175° C. | 0 | 92 | 2,000 | — |
|    |        | 175° C. | 200 | 152 | 2,462 | — |
| 5. | V PEEK/ PPO 30/70 | RT | 0 | 5 | 5,354 | — |
|    |        | RT | 200 | 5 | 5,815 | — |
|    |        | 175° C. | 0 | 63 | 769 | — |
|    |        | 175° C. | 200 | 37 | 1,385 | — |
| 6. | V PEEK/ NORYL 90/10 | RT | 0 | 76 | 11,192 | — |
|    |        | RT | 200 | 49 | 11,200 | — |
|    |        | 175° C. | 0 | >294 | >6,846 | — |
|    |        | 175° C. | 200 | >255 | >6,231 | — |
| 7. | V PEEK/ NORYL 70/30 | RT | 0 | 5 | 12,246 | — |
|    |        | RT | 200 | 5 | 11,769 | — |
|    |        | 175° C. | 0 | 292 | 4,800 | — |
|    |        | 175° C. | 200 | >299 | >5,262 | — |
| 8. | V PEEK/ NORYL 50/50 | RT | 0 | 5 | 8,939 | 66 |
|    |        | RT | 200 | 5 | 9,692 | 86 |
|    |        | 175° C. | 0 | 128 | 2,077 | — |
|    |        | 175° C. | 200 | 203 | 2,816 | — |

*ROOM TEMPERATURE

TABLE II

BLENDS FOR FRICTION AND WEAR APPLICATIONS

| EX. | Material | Ratio | Beam Doses (Mrads) | Wear* Rate $CM_{13}$/Day | R.T. Tensile Strength (PSI) | Eb % | 5% Modulus PSI | Hardness (Shore D) |
|---|---|---|---|---|---|---|---|---|
| 1 | V PEEK/ PPO/Graphite | 70/20/10 | 0 | $6.18 \times 10^{-5}$ | 11805 | 10 | 186,000 | 83 |
| 2 | V PEEK/ PPO/Graphite | 70/20/10 | 50 | $6.34 \times 10^{-5}$ | — | — | — | — |
| 3 | V PEEK/ PPO/Graphite | 70/20/10 | 100 | $3.20 \times 10^{-5}$ | 14250 | 10 | 249,700 | 88 |
| 4 | V PEEK/ PPO/Graphite | 70/20/10 | 200 | $2.18 \times 10^{-5}$ | 14140 | 10 | 248,500 | 85 |
| 5 | V PEEK/ PPO/Graphite | 70/20/10 | 400 | — | 14260 | 10 | 232,500 | 82 |

TABLE III

| EX. | Material | Ratio | Beam Dose | Wear Factor (Ko*) |
|---|---|---|---|---|
| 1 | V PEEK | 100 | 0 | 200 |
| 2 | V/PEEK/ PPO/Graphite | 90/10 | 0 | 60 |
| 3 | V PEEK/ PPO/Graphite | 80/10/10 | 0 | 58 |
| 4 | V PEEK/ PPO/Graphite | 80/10/10 | 0 | 58 |
| 5 | V PEEK | 80/10/10 | 200 | 41 |

What is claimed:

1. A composition comprising a blend of a poly(aryl ether ketone) and from about 1% to about 50% of poly(2,6-dimethyl-p-phenylene oxide).
2. A composition according to claim 1 wherein the poly(2,6-dimethyl-p-phenylene oxide) comprises from about 1% to about 30% of the blend.
3. A composition according to claim 1 which has been subjected to crosslinking means.
4. An article comprising a blend of a poly(aryl ether ketone) and from about 1% to about 50% of poly(2,6-dimethyl-p-phenylene oxide).
5. An article according to claim 4 wherein the poly (2,6-dimethyl-p-phenylene oxide) comprises from about 1% to about 30% of the blend.
6. An article according to claim 4 which has been subjected to crosslinking means.

* * * * *